United States Patent [19]
Lechner et al.

[11] Patent Number: 5,274,692
[45] Date of Patent: Dec. 28, 1993

[54] METHOD FOR TESTING THE LINE CONNECTION BEFORE SWITCHING FROM A TELEPHONE SWITCHING CENTER TO BE PLACED OUT OF SERVICE TO A NEW DIGITAL TELEPHONE SWITCHING CENTER TO BE PLACED INTO SERVICE

[75] Inventors: Robert Lechner, Boeheimkirchen, Austria; Tom Miller, Boca Raton, Fla.

[73] Assignee: Siemens Aktiengesellschaft, Munich

[21] Appl. No.: 744,884

[22] Filed: Aug. 14, 1991

[30] Foreign Application Priority Data

Aug. 14, 1990 [DE] Fed. Rep. of Germany ....... 4025750

[51] Int. Cl.$^5$ ............................................. H04M 7/12
[52] U.S. Cl. ............................................ 379/6; 379/10; 379/279
[58] Field of Search ................. 379/6, 10, 11, 12, 16, 379/25, 26, 27, 29, 275; 370/14, 15

[56] References Cited

U.S. PATENT DOCUMENTS

| | | | |
|---|---|---|---|
| 4,453,048 | 6/1984 | Daniels et al. | 379/16 |
| 4,653,043 | 3/1987 | Brady et al. | 379/25 X |

*Primary Examiner*—Curtis Kuntz
*Assistant Examiner*—Paul Loomis
*Attorney, Agent, or Firm*—Hill, Steadman & Simpson

[57] ABSTRACT

Given simultaneous connection of the subscriber line circuits by way of a main distributor to a new switching center and to an existing or old switching center, the subscriber terminals are successively selected proceeding from the new switching center and the old switching center produces connections from a test terminal to these subscriber line circuits. A tone generator of the new switching center supplies a test code word by way of these connections that proceeds via a termination-associated test connection contact and via an external test bus to a code character receiver of the new switching center and is checked therein for coincidence with the test code word.

3 Claims, 2 Drawing Sheets

FIG 2

METHOD FOR TESTING THE LINE CONNECTION BEFORE SWITCHING FROM A TELEPHONE SWITCHING CENTER TO BE PLACED OUT OF SERVICE TO A NEW DIGITAL TELEPHONE SWITCHING CENTER TO BE PLACED INTO SERVICE

BACKGROUND OF THE INVENTION

1. Field of the Invention

The present invention relates to a method for replacing an existing telephone switching center with a new telephone switching center, and is more particularly concerned with the testing of line connections before switching over from the old switching center to the new switching center.

2. Description of the Prior Art

As mentioned above, the present invention is directed to a method for testing a line connection before switching from a telephone switching center (old switching center) to be taken out of service to a digital telephone switching center (new switching center) to be newly placed into operation. The line termination circuits of the system contain test circuit contacts, of which one serves the purpose of connecting the line termination accessible via a main distributor to a bus shared by all line termination circuits of at least one group of line input/output circuits and a further test circuit contact serving the purpose of connecting the line termination to the further components of the line input/output circuit. The system further contains tone generators shared by groups of line termination circuits for generating what are, above all, switching-oriented call progress tones and code receivers for selection signals and other signals that can be assigned, as needed, to the line termination circuits, as well as two special termination circuits largely corresponding to the line termination circuits in terms of function by way of which selection information can be output just as from a terminal equipment.

In a switching system of the type set forth above, the subscriber lines are disconnected from the old switching center and are connected to the new switching center at a main distributor, which is already prepared for this purpose by separating connecting bridges or, respectively, by attaching new connecting bridges. It must be assured in such a rewiring that the same subscriber number remains assigned to the terminal equipment. A test must also be carried out to see whether the correct assignment of the database to the individual subscriber connections is established in the new switching center.

A manual method that was heretofore practiced for testing of the line connection shall be set forth in greater detail below with reference to FIG. 1.

With respect to the prior art, FIG. 1 illustrates an old or existing switching center AV and a new switching center NV, each having subscriber line input/output 0-N to which subscriber terminal equipment T1n0-T1nN are connected or, respectively, can be connected via subscriber lines and via a main distributor HV. For each subscriber line is provided a subscriber line termination circuit through which signals are input and output between the subscriber line and the main distributor. A plurality of connection bridges is provided by way of which the connection of the subscriber terminal equipment or, respectively, of the subscriber line termination circuits of the subscriber lines to the old switching center AV is provided, the connection bridges being referenced IA0-IAN, which are plugged into the main distributor HV. The connection bridges IN0-INN must be plugged for connecting the subscriber terminal equipment to the new switching center.

In addition to the connection for the subscriber lines input/output, the two switching centers each respectively comprise a test connection input/output T, by way of which the connected subscriber terminal equipment can be selected by inputting selection information. Testing equipment MBTE is connected to these test connection input/output in the present example. With the assistance of a test plug P that can be plugged instead of the switching bridges IN0-INN, inputs of the testing equipment can be connected both to a line termination circuit via the old switching center AV as well as to a line termination circuit via the new switching center NV. The speakers of a headset EPh are electrically connected to these inputs.

For testing the line connection, the test plug P is then plugged instead of the switching bridge that connects to a line input/output of the new switching center NV and the subscriber number corresponding to the terminal is selected with the assistance of the testing equipment MBTE. A connection from the test connection input/output to the appertaining line termination circuit is therefore produced via the old switching center, as well as via the new switching center. This set-up of connections occurring via the test connection input/output is of such a nature that the appertaining subscriber terminal equipment does not receive a call. The testing equipment now transmits a test tone to both switching centers and the operator checks via the headset EPh whether this test tone can be received by the subscriber lines of both switching centers. Insofar as this is not the case, a check of the wiring that has been undertaken in the main distributor must be undertaken or, respectively, a check of the assignment of the data base to the appertaining line termination must be undertaken.

When all line inputs/outputs have been checked and found to be correct, the switching bridges IA0-IAN that connect to the old switching center AV are pulled (disconnected) and the switching bridges IN0-INN that connected to the new switching center NV are plugged in.

This testing procedure requires a considerable amount of time and effort.

SUMMARY OF THE INVENTION

It is, therefore, the object of the present invention to provide a method for testing the line connections that sequences through the testing steps automatically and, in addition, whose implementation requires that only slight hardware modifications be undertaken at the new switching center.

The above object is achieved, according to the present invention, in a method of the type basically set forth above, for testing line connections before switching from an existing or old telephone switching center to be taken out of operation to a digital telephone switching center or new switching center to be newly placed into operation. The subscriber line termination circuits thereof have test connection contacts assigned thereto, of which the first test connection contact serves the purpose of connecting the subscriber line input/output, also termed subscriber line termination circuit, accessible via a main distributor to a bus shared in common by all subscriber line circuits of at least one group of the subscriber line circuits individually assigned to the subscriber lines and of which a second test contact serves the purpose of connecting the subscriber line inputs/outputs to the actual subscriber line circuit. Further comprised herein are tone generators shared in common by groups of subscriber line circuits for mainly generating switching-oriented call progress tones and containing code receivers for selection signals and other signals that can be assigned to the subscriber line circuits as needed, as well as two special line circuits which largely correspond in function to the subscriber line circuits by way of which selection information can be output just as from a terminal equipment. The system and the invention is particularly characterized in that, given connections of the subscriber lines to the subscriber line inputs/outputs of both the old switching center and the new switching center that should correspond to one another and which are produced in a main distributor by connecting bridges, the first test connection contact at the subscriber line circuits of the new switching center is closed for producing a connection to the bus and the second connection contact is successively closed, and the terminal equipment, whose subscriber line circuit is to be tested, is selected by the new switching center by way of a plug test connection established in a contact bridge in the main distributor corresponding to the contact bridges between a special line circuit of the new switching center and a test input/output of the old switching center and assignment of the tone generator to the one special line circuit and of a code receiver to the other special line circuit, whereby the first and second test connection contacts belonging to the special line circuits are closed, whereupon the old switching center produces a telephone connection between the one special line circuit and the new switching center and the terminal equipment and, therefore, the appertaining subscriber line circuit of the new switching center as well, by way of which telephone connection test signals transmitted by the tone generator proceed via the old switching center and by way of which the first test connection contact and the bus and the new switching center and, from the latter, to the code receiver are checked for coincidence with the pattern of the transmitted test signal. In response to the foregoing, insofar as the circuits are established, a repetition of the events in conjunction with a following line termination is immediately initiated or, respectively, insofar as it is not established, an error tracing with respect to the appertaining line termination is previously initiated by the central controller of the new switching center.

According to a particular feature of the invention, a circuit arrangement for carrying out the above method is particularly characterized in that, given the presence of a plurality of groups of subscriber line circuits and of a further common bus they can be reached from the subscriber line circuits via a respective third test connection contact, the second and third test connection contacts are fashioned as a switch-over or transfer contact of a single relay, and in that relays assigned to the subscriber line circuits are present by way of which contacts thereof of the group-by-group connection of the subscriber line circuits to the further bus occurs.

Accordingly, test connection contacts, an internal test bus, and special terminals by way of which subscriber line equipment can be directly selected proceeding from the switching center as though proceeding from a subscriber terminal equipment, which subscriber terminal equipment will be subscriber terminal equipment of a private branch exchange (PBX) in practice, that are already present in the subscriber line circuits, as well as tone generators and code receivers for selection signals that are already assigned to subscriber line groups and are, likewise, already present, are utilized for the implementation of the test.

According to a further development of the invention, test connection contacts are eliminated.

BRIEF DESCRIPTION OF THE DRAWINGS

Other objects, features and advantages of the invention, its organization, construction and operation, will be best understood from the following detailed description, taken in conjunction with the accompanying drawings, on which:

FIG. 2 is a schematic circuit diagram of an arrangement for the implementation of the method of the present invention for testing line connections in establishing same between a new switching center from an old or existing switching center.

DESCRIPTION OF THE PREFERRED EMBODIMENTS

Figure 1:
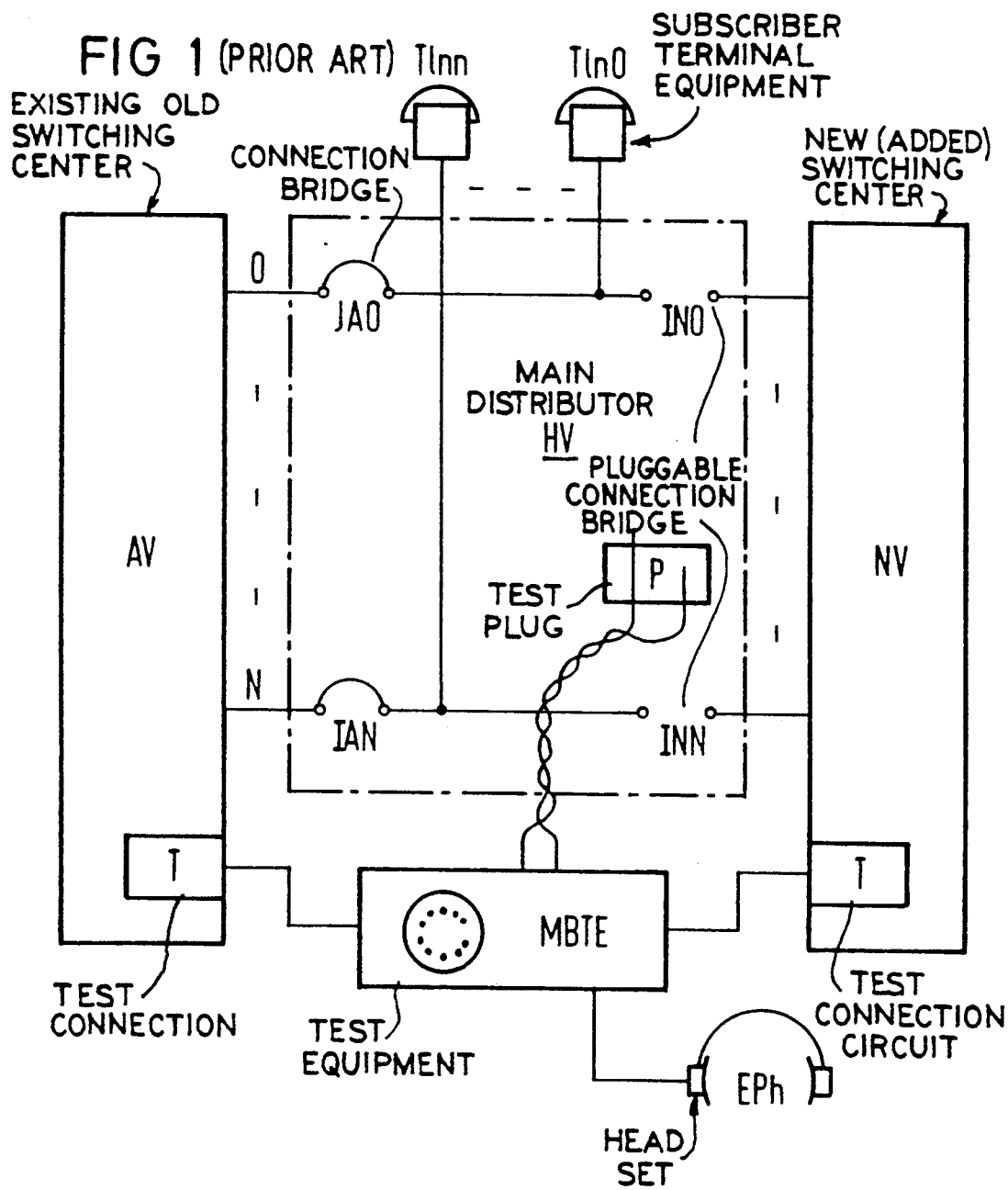
FIG. 1 is a schematic block circuit diagram of a known arrangement for the implementation of a method for testing line connections.

The structure of FIG. 1 has been discussed above and will not be further detailed below.

Figure 2:
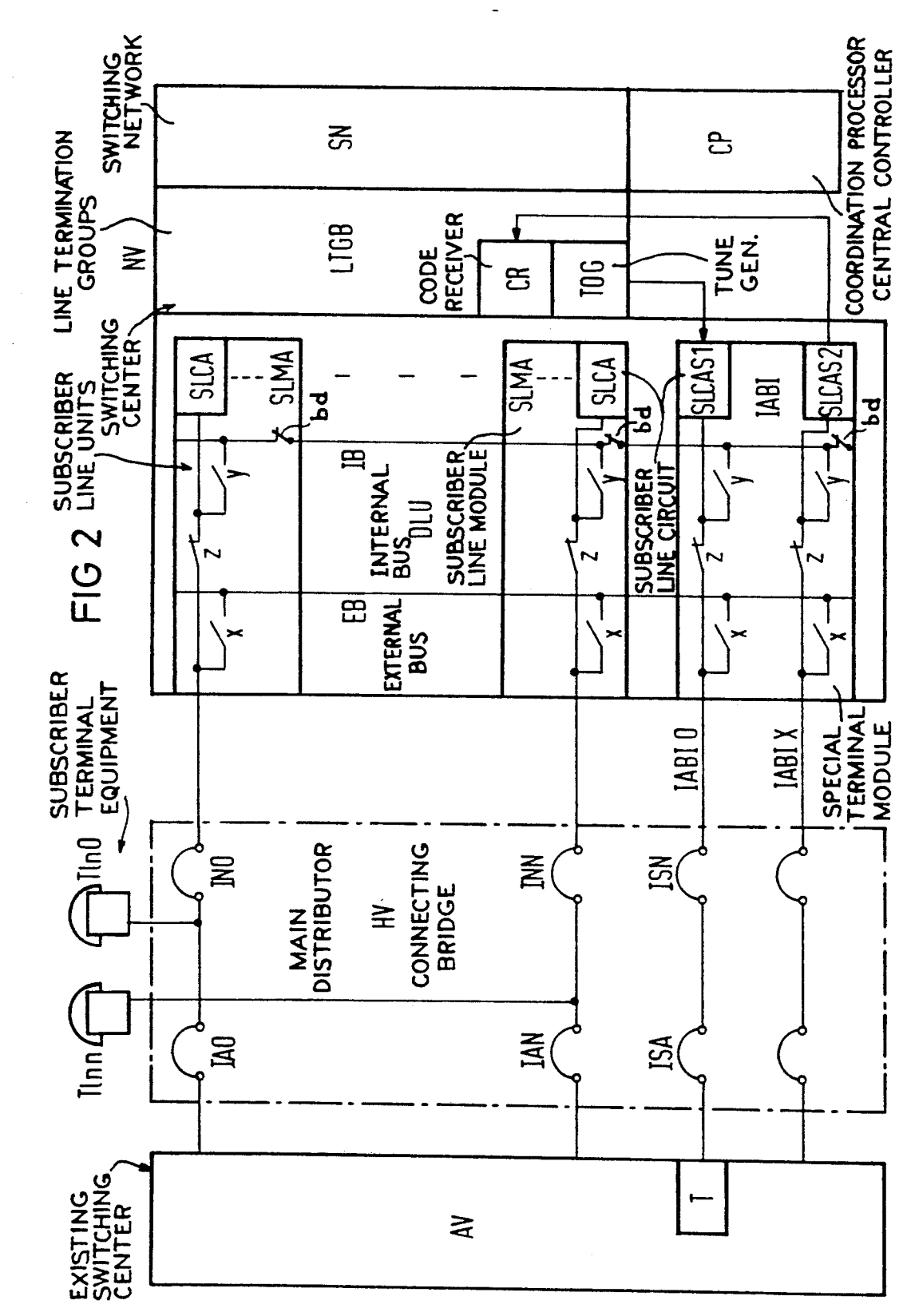

FIG. 2, as in FIG. 1, illustrates what is referred to as an old or existing switching center AV to be taken out of operation, and what is referred to as a new switching center NV to be newly placed into operation. FIG. 2 also illustrates a main distributor HV, in which connections of the subscriber lines from the subscriber terminal equipment T1n0-T1nN via subscriber line inputs/outputs, also termed subscriber line terminal circuits of the old switching center AV or, respectively, to the new switching center NV can be produced with connecting bridges IA0-IAN or, respectively, IN0-INN.

The critical components of the new switching center NV are subscriber line units DLU, of which one is illustrated here and which can also be arranged apart from the switching center, the line termination groups LTGB assigned in pairs to the subscriber line units, only one of which is likewise illustrated, a switching network SN, as well as a coordination processor CP.

The subscriber line units DLU are, in turn, divided into subscriber line modules SLMA that each, respectively, cover a plurality of, for example, eight subscriber line circuits SLCA that represent the actual interfaces to the subscriber lines.

At the new switching center NV, illustrated in FIG. 2, contacts x, y and z are illustrated. The contacts x assist a connection of the lines coming from the main distributor HV and leading to the subscriber line circuits SLCA to an external bus EB. The contacts y assist in a connection of the lines to an internal bus IB and the contacts z on the subscriber line input/output side lying between the contacts x and y assist in the connection from the subscriber line input/output, or subscriber line terminal circuit, to the subscriber line circuit SLCA for the purpose of interruption. These contacts predominately serve the purpose of implementing the greatest variety of tests of the subscriber line circuits SLCA or, respectively, of the line termination groups LTGB.

In addition to the mentioned subscriber line modules SLMA, FIG. 2 illustrates a special termination module IABI having two special line circuits SLCAS1 and SLCAS2 that largely function corresponding to the subscriber line modules SLMA or, respectively, to the subscriber line circuits SLCA. In the same manner as the subscriber line circuits SLCA, the special line circuits SLCAS are connectible via the contact z to the subscriber line inputs/outputs or, respectively, by way of the contacts y and x to the internal bus IB or, respectively, to the external bus EB. There is also a connection of the subscriber line input/output of the special line circuit SLCAS1 to the test connection circuit T of the old switching center AV by way of bridges ISN and ISA of the main distributor.

Among other things, a tone generator TOG is a component of the aforementioned line termination groups LTGB, the tone generator TOG mainly serving the purpose of generating switching-oriented call progress tones, but that is equipped, in view of the present invention, such that it is also capable of outputting a test tone. Also belonging to such a line termination group is a code receiver CR that mainly serves the purpose of evaluating multi-frequency code selection signals, but that can also undertake the evaluation of the mentioned test tone signal in view of, and with respect to, the method of the present invention. As needed, both the tone generator TOG and the code receiver CR can be allocated to the subscriber line circuits during the course of a normal connection setup and can be assigned to the special line circuits SLAS1 or, respectively, SLAS2 in conjunction with the implementation of the method of the present invention.

The method of the present invention shall be set forth below in greater detail with reference to FIG. 2.

At the beginning of the test of the line connection to be implemented in accordance with the method of the present invention, all connection bridges are plugged in the main distributor HV, i.e. the subscriber terminal equipment T1n0-T1nN are connected both to the old switching center AV, as well as to the new switching center NV.

The contact z is closed at the first special line circuit SLCAS1, a connection of this special line circuit to the test terminal T of the old switching center AV being, therefore, established; the contacts x and y are open. At the second special line circuit SLCAS2, both the contacts z and x are closed, a connection of this special line circuit to the external test bus EB, therefore, being established.

An assignment of the tone generator TOG to the first special line circuit SLCAS1 and an assignment of the code receiver CR to the second special line circuit SLCAS2 is undertaken by the new switching center NV.

Beginning with the first subscriber line input/output, the contact x assigned to this line termination, i.e. to that line termination at which the subscriber line circuit of the subscriber terminal equipment T1n0 should lie given correct assignment, is closed by the new switching center NV, this subscriber line input/output, therefore, likewise, lying at the external test bus EB.

The new switching center NV now initiates the direct selection of the subscriber termination equipment T1n0 by the old switching center AV, this occurring in that the corresponding selection signals are supplied to the test terminal T via the special line circuit SLCAS1, as a result whereof a voice connection is established back to the code receiver CR from the tone generator TOG by way of a special line circuit SLCAS1, by way of the test terminal T, the line connection covering the connecting bridges IA0 and IN0 to be tested, the external test bus EB and by way of the contacts x and z that are assigned to the special line circuit SLCAS2.

Initiated by the control processor CP of this line group LTGB, the tone generator TOG transmits a sequence of test tones that, given a line connection of the old switching center and the new switching center produced in proper assignment, proceeds over the described voice path to the code receiver CR and is checked for coincidence therein. When the test tone sequence is recognized, the described events repeat in conjunction with the following subscriber line input/output. When the test tone is not recognized, then a tracing is performed in which the spatial position designation of the subscriber line circuit SLCA or, respectively, of the contact x that can be reached under the same address, as well as the telephone number that had been selected and the corresponding testing procedure is identified before proceeding to the next subscriber line circuit or, respectively, to the corresponding, next line termination.

After all subscriber line input/output have been handled in this manner, the old switching center AV is disconnected by pulling or unplugging the old connecting bridges IA0–IAn, ISA.

In the arrangement set forth above, three relays for the actuation of the contacts x, y and z are present per subscriber line circuit. As set forth, the contact x is respectively closed during the course of a line connection test, but the contacts z and y are open. In the case of the contacts that are allocated to the special line circuits, the conditions are somewhat different, as presented above.

According to a further feature and development of the invention, the contacts z and y are realized as switch-over or transfer contacts of a single relay for the purpose of eliminating relays at the individual subscriber line circuits SLCA, this being unproblematical in view of tests of the subscriber line circuits that are to be implemented independently of the line connection tests set forth, but being problematical in conjunction with the line connection tests since the contact z can then always be opened, as required, at a line termination to be tested, but a connecting line of the subscriber line circuit also lies at the internal test bus IB of the contact y. Since a connection of subscriber line circuits that belong to different subscriber line modules SLMA is undesirable in this context, a relay having the contact bd for disconnecting the line module from the internal test bus IB is, therefore, provided, according to the present invention, for line module SLMA, as indicated in FIG. 2.

Since eight subscriber line circuits SLCA are normally required at the subscriber line module SLMA, these latter measures can mean an elimination of seven relays per subscriber line module SLMA.

Although we have described our invention by reference to particular illustrated embodiments thereof, many changes and modifications of the invention may become apparent to those skilled in the art without departing from the spirit and scope of the invention. We, therefore, intend to include within the patent warranted hereon all such changes and modifications as may reasonably and properly be included within the scope of our contribution to the art.

We claim:

1. A method for testing subscriber line connections to an existing switching center which is to be taken out of service and a new switching center which is to be placed into service, in which subscriber line termination circuits have test connection contacts assigned thereto, in which a first contact is provided for making the respective subscriber line input/output accessible via a main distributor to a bus shared in common by all subscriber line termination circuits of at least one group of subscriber line termination circuits, a second contact is provided for connecting a subscriber line input/output to the respective subscriber line termination circuit, tone generator means are shared by groups of subscriber line termination circuits for generating switching-oriented call progress tones and code receiver means are provided for reading signals, including selection signals and other signals which can be allocated to the subscriber line termination circuits as needed, and first and second special line circuits for providing selection information from a terminal equipment, comprising the steps of:

- establishing connections of a subscriber line both to the existing switching center and to a new switching center which correspond to one another by connecting bridges in the main distributor;
- closing the second contact and opening the first contact at the first special line circuit and closing both the first and second contacts at the second special line circuit;
- successively closing the first contacts and opening the second contacts of selected subscriber line termination circuits and establishing a telephone connection between said first special circuit and the tone generator means and said selected subscriber line termination circuits via said existing switching center;
- generating telephone test connection signals with said tone generator means and transmitting the same via said existing switching center and via a first of said test connection contacts of selected subscriber line termination circuits and via said bus in said new switching center to said second special line circuit and said code receiver;
- checking the received signals with respect to a pattern of the transmitted signals;
- conducting an error trace when the signals do not coincide; and
- repeating the test for each other line termination when the signals coincide.

2. Apparatus for testing subscriber line connections to an existing switching center which is to be taken out of service and a new switching center which is to be placed into service, comprising:

- subscriber line termination circuits including test connection contacts assigned thereto, a first contact of which is provided for making a respective one of said subscriber line input/output circuits accessible via a main distributor to a bus shared in common by all of said subscriber line termination circuits of at least one group of said subscriber line termination circuits, a second contact of which is provided for connecting a subscriber line input/output to the respective subscriber line termination circuit,
- tone generator means are connectible to and shared by groups of subscriber line termination circuits for generating switching-oriented call progress tones;
- code receiver means are connectible thereto for reading signals, including selection signals and other signals which can be allocated to the subscriber line termination circuits as needed, and
- two special line circuits provide selection information from a terminal equipment, and further comprising:
- main distributor means including means for establishing connections of a subscriber line both to the existing switching center and to a new switching center which correspond to one another including connecting bridges in said main distributor;
- means for closing said second contact and opening said first contact at the first special line circuit and closing both the first and second contact at the second special line circuit; and
- means for successively closing the first contacts and opening the second contacts of selected subscriber line termination circuits and establishing a telephone connection between said first special line circuit and the tone generator means and said selected subscriber line termination circuit via said existing switching center;
- whereby said tone generator generates telephone test connection signals and transmits the same via said existing switching center and via said first of said test connection contacts of selected subscriber line circuits and via said bus in said new switching center to said second special line circuit and said code receiver;
- checking means check the received signals with respect to a pattern of the transmitted signals;
- means for conducting an error trace when the signals do not coincide; and
- means including the above for repeating the test for each other subscriber line termination circuit when the signals coincide.

3. The apparatus of claim 2, and further comprising:
a further bus; and
third contacts, each allocated to a respective subscriber line circuit for connecting the same on a group-by-group basis to said special line circuits.

* * * * *